United States Patent Office 2,908,226
Patented Oct. 13, 1959

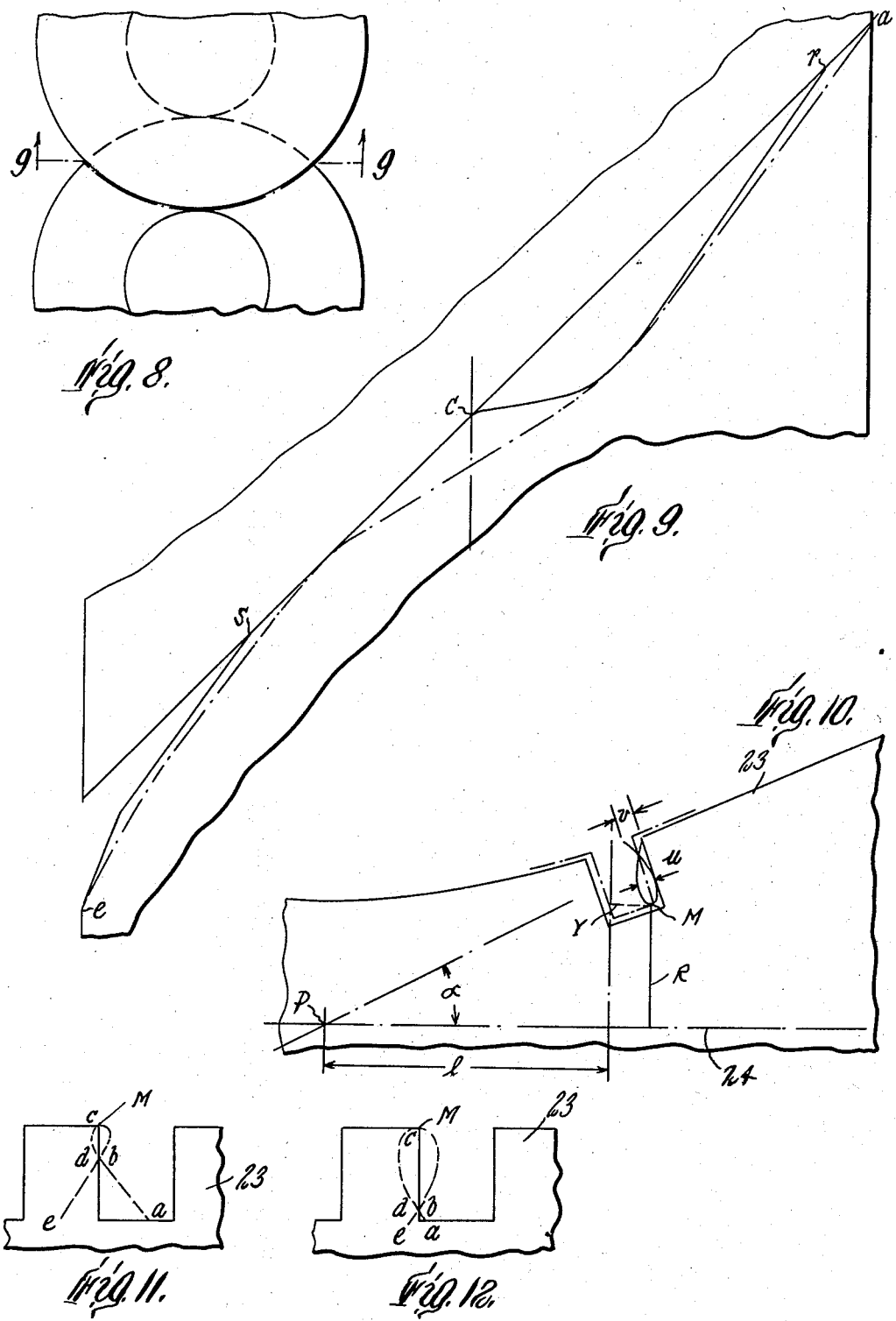

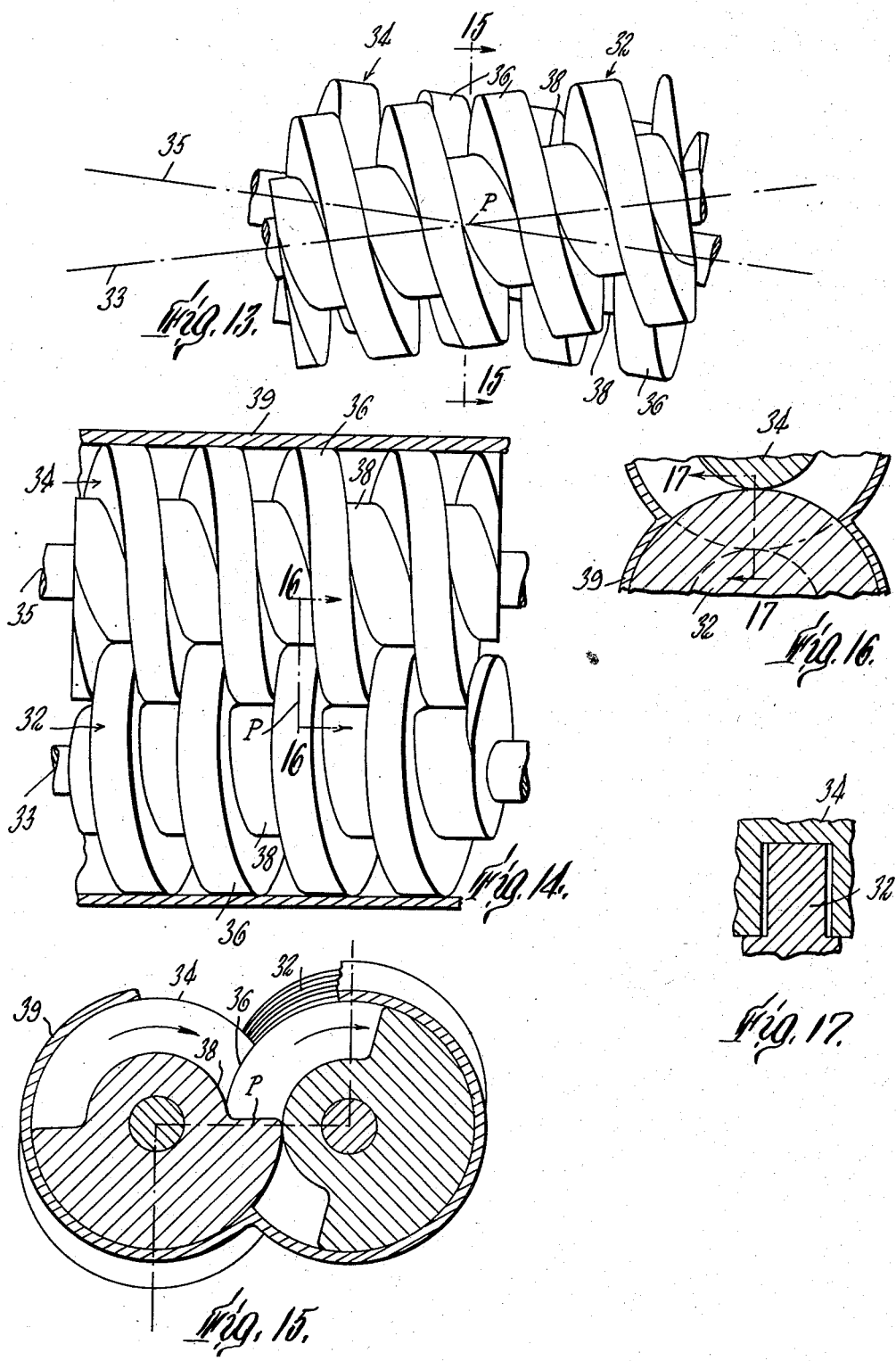

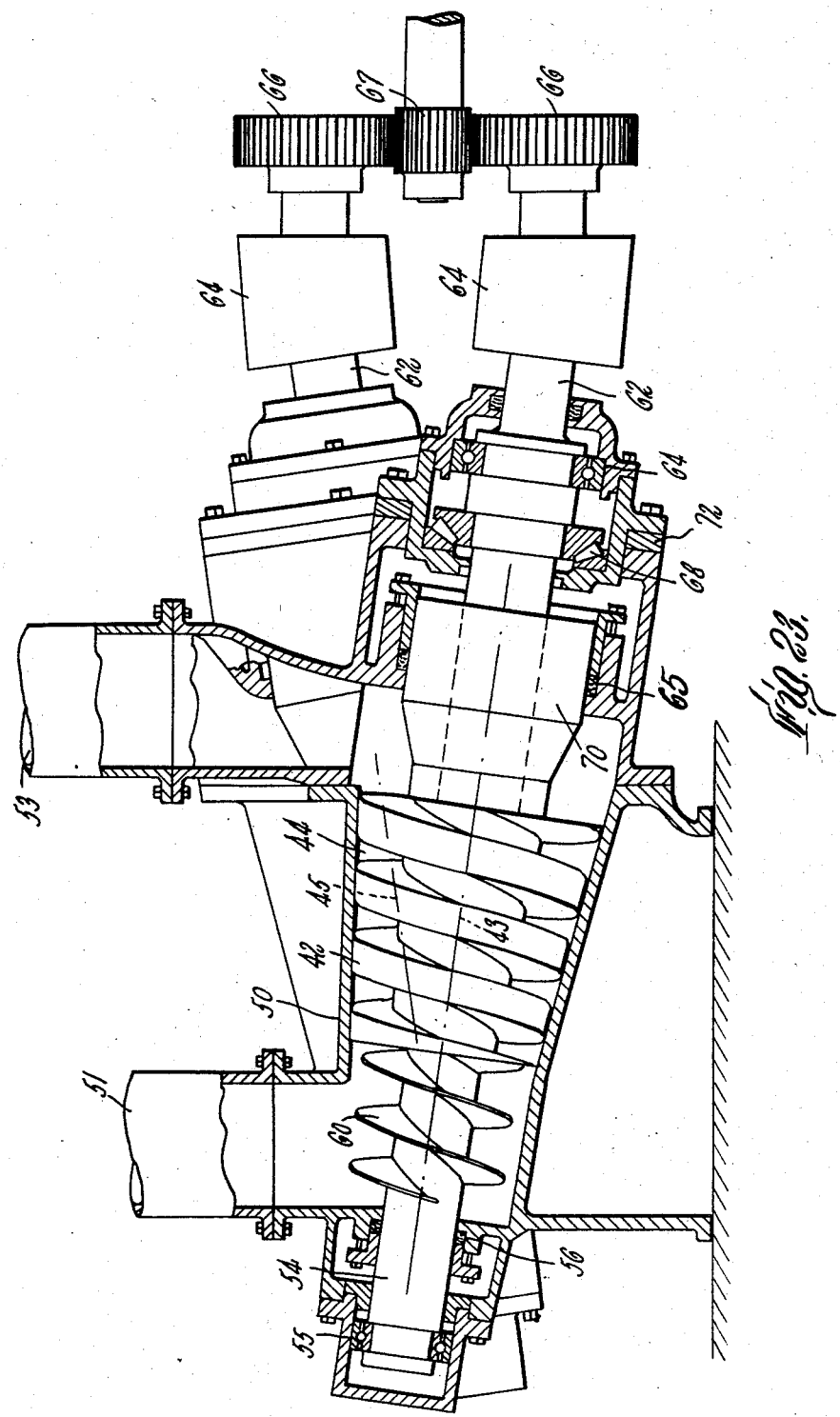

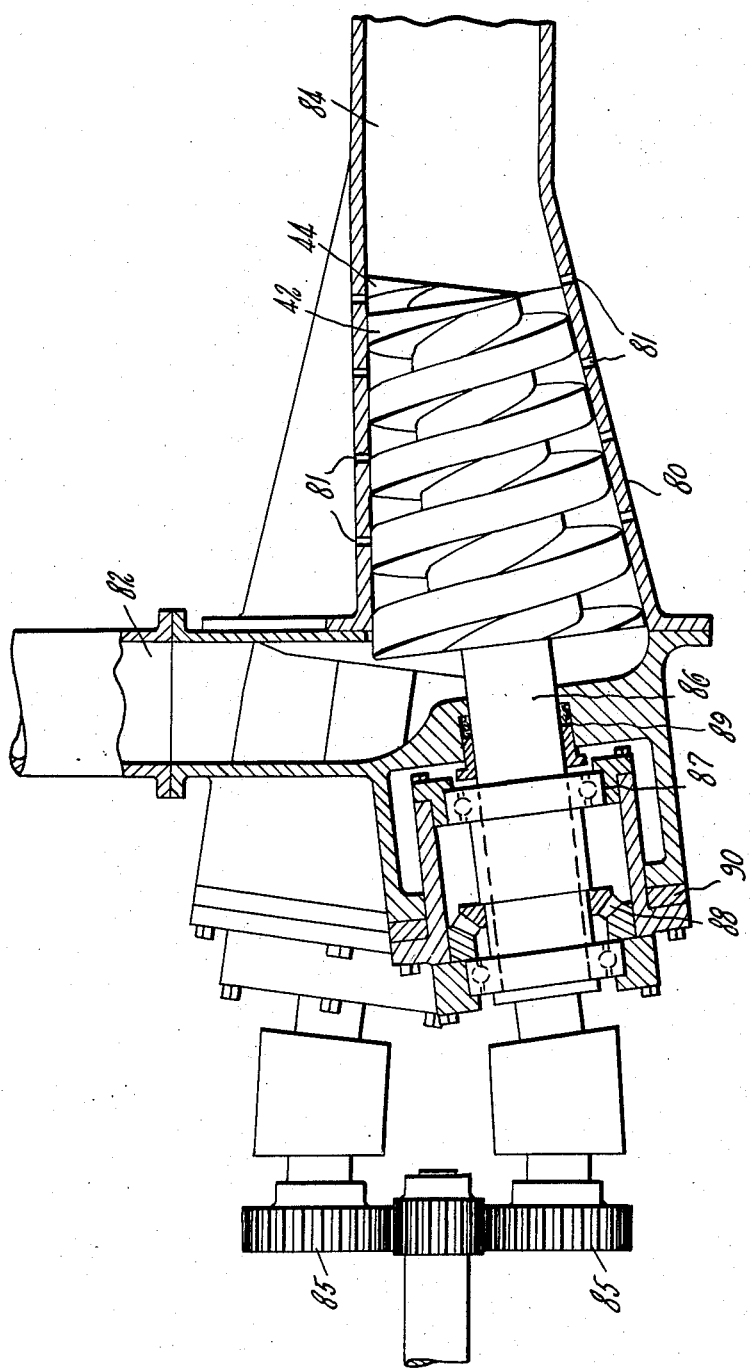

2,908,226

INTERMESHING SCREW PUMPS AND THE LIKE

John P. Rich and Oscar Luthi, Nashua, and Walter N. Thompson, Mont Vernon, N.H., assignors to Improved Machinery Inc., Nashua, N.H., a corporation of Maine Application December 31, 1956, Serial No. 631,577

17 Claims. (Cl. 103—128)

This invention relates to plural intermeshing screw structures, particularly useful as pumps for liquid-solid mixtures, especially in high pressure applications, or as screw presses, or the like.

In this general art, intermeshing screws mounted within a suitable housing and rotating in the same direction about their respective parallel or intersecting axes have heretofore been used in some applications as conveyors for viscous liquids, semi-liquids, pulverized solids or liquid-solid mixtures because the intermeshing of the threads effectively prevents rotation of the material being conveyed, while the motion of meshing threads in opposite directions overcomes the jamming tendency which occurs when the threads move in the same direction as they mesh. These heretofore known structures have been unsuitable, however, for pumping liquids of low viscosity, such as water, against any appreciable pressure, since they had passages communicating between the grooves of one screw and those of the other which allowed back leakage, especially at high pressures of the order of several hundred pounds per square inch, of virtually all of the liquid being moved forward. With mixtures of liquids and solids or when conveying solids against gas or steam pressure, attempts were made to meet this problem by adding a structure which would maintain a plug of solid material adjacent to the output side of the screws to prevent direct communication from the high pressure area to the back leakage path of the screws. However, even aside from the undesirability of building such additional structure, many materials were not capable of providing or maintaining the necessary plug and, additionally, it has proved disadvantageous with some materials to compress them into a plug of sufficient density.

Furthermore, such heretofore known intermeshing screw pumps have proved to be difficult to design and manufacture, especially for use against high pressure, since their shafts were so close together as to leave little room for the necessary thrust bearings, fluid seals, and driving gears.

Accordingly, it is an object of the present invention to provide a plural intermeshing screw structure, especially useful as a pump or the like, wherein the screws rotate within a suitable housing in the same direction to prevent jamming or clogging, and yet one in which the back leakage path is so much reduced as to permit the pumping of various materials, including fluids of low viscosity, even water, into pressures of the order of 1000 pounds per square inch. In addition, it is a particular feature of the invention that the structure provided can be designed to allow the use of much larger bearings, seals, and gears than would be the case with heretofore known plural screw structures.

In general, the novel structure of the invention comprises a plurality, usually a pair of intermeshing screw-threaded members, having threads of the same hand and extending for at least one complete turn, mounted within a suitable enclosing housing for simultaneous rotation in the same direction about their respective skew axes (as distinguished from axes in the same plane such as parallel or intersecting axes, skew axes thus being defined herein as non-coplanar, non-parallel, non-intersecting axes). Such an arrangement has been found to have a number of unique and important advantages over heretofore-known structures, and makes possible a great reduction in back leakage path by the utilization of threads having a generally rectangular form and preferably with a lead angle of approximately one-half the skew angle between the screw axes. Furthermore, since the theoretically accurate shape of identical intermeshing screws of the invention at their pitch diameters is that of a hyperboloid of revolution, with relatively small skew angles, of the order of 10°, preferably in the range of 5 to 30° either generally cylindrical or generally conical screw members can be employed as useful approximations, even with multiple turn threads, to provide multiple-stage fluid sealing. Such conical screw member configuration is especially useful where wear is a factor, since adjustment to take up wear is readily accomplished by moving the conical screws axially toward their smaller ends. As a practical matter, too, the use of skew axes, wherein the axes diverge from one another, allows the use of large thrust bearings, seals, and gears, as is especially important in structures intended for high pressure use.

For the purpose of explaining preferred embodiments of our invention, reference is now made to the following specification, together with the accompanying drawings, wherein:

Fig. 8 is a simplified enlarged cross-sectional end view of the screws of Fig. 2;

Fig. 9 is a developed section of said screws taken on the line 9—9 of Fig. 8;

Fig. 10 is an enlarged axial cross-sectional view similar to that of Fig. 2 and illustrating a basis for a derivation of tooth form;

Figs. 11 and 12 are enlarged axial cross-sectional portions of a screw showing modifications of tooth form;

Fig. 13 is a side view of a pair of cylindrical intermeshing screws according to a modification of the present invention with their housing omitted;

Fig. 14 is a plan view of the screws of Fig. 13 with their housing broken away;

Fig. 15 is a cross-sectional end view of the screws of Fig. 13 taken on the line 15—15 thereof;

Fig. 16 is an enlarged partial sectional view taken on the line 16—16 of Fig. 14;

Fig. 17 is an enlarged sectional view taken on the lines 17—17 of Fig. 16;

Figure 20:
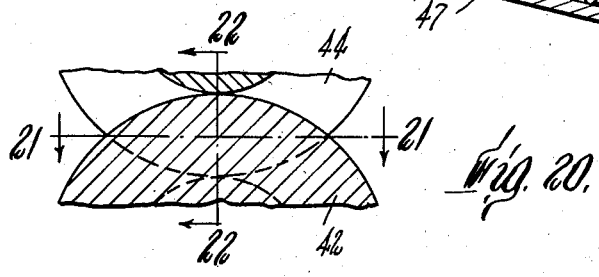
Fig. 20 is an enlarged cross-sectional end view of the screws of Fig. 19 taken on the line 20—20 thereof.
Figure 21:
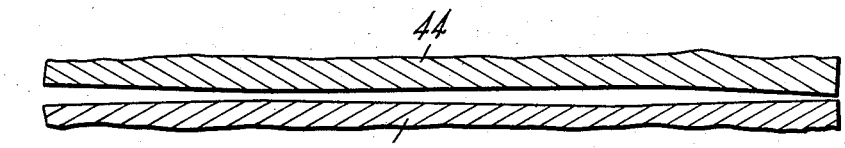
Figure 22:
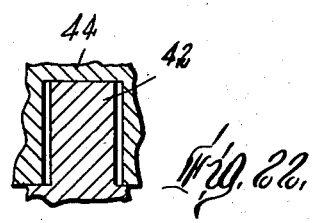

Figs. 21 and 22 are enlarged sectional views taken on the lines 21—21 and 22—22 of Fig. 20;

Fig. 23 is a cross-sectional side view of a complete pump including the conical screws of Figs. 19—22; and Fig. 24 is a cross-sectional side view of a complete screw press including the conical screws of Figs. 19—22.

Figure 1:
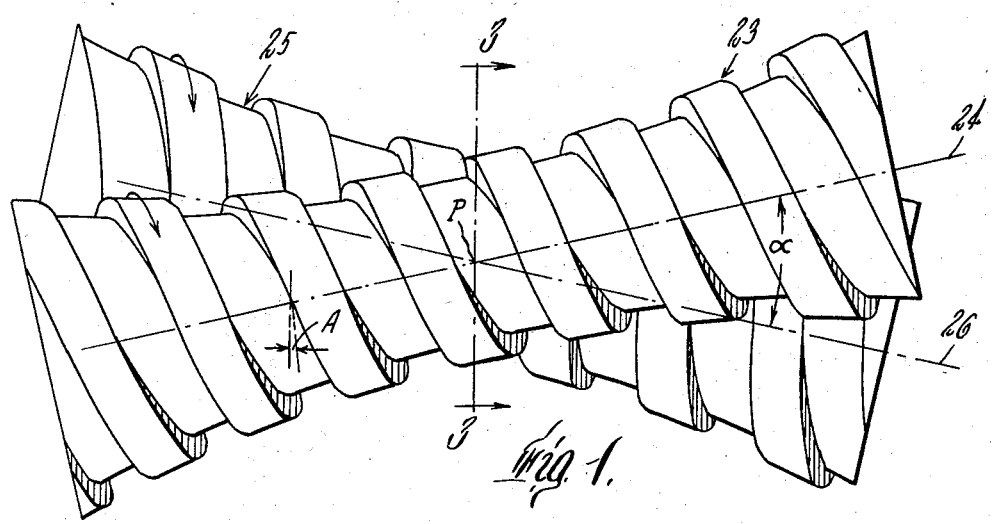
Fig. 1 is a side view of a pair of intermeshing screws according to the present invention.
Figure 2:
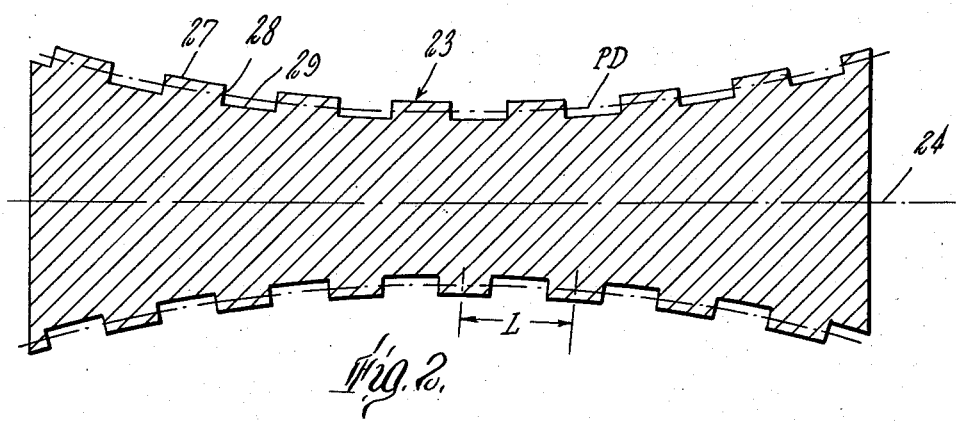
Fig. 2 is an axial cross-sectional view of one of the screws of Fig. 1.
Figure 3:
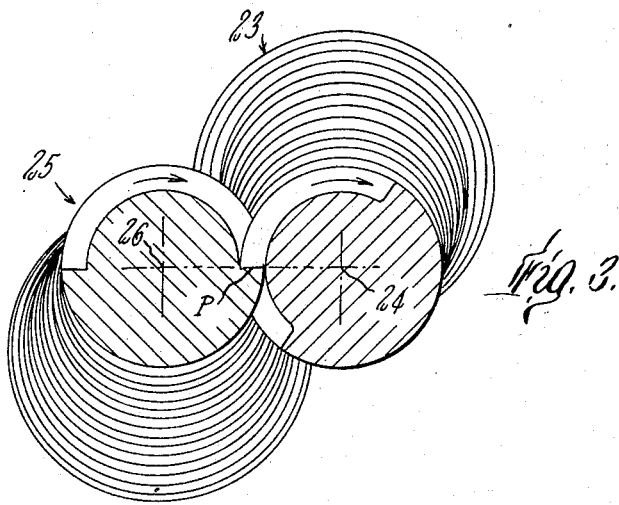
Fig. 3 is a cross-sectional end view of the screws of Fig. 1 taken on the line 3—3 thereof.

Referring first to Figs. 1 through 3, wherein the housing for the intermeshing screw structure has been omitted in the interests of clarity, the intermeshing screw members according to the present invention, generally designated 23 and 25 are identical, each having generally rectangular threads with lead of the same hand extending for at least one full turn and preferably for a plurality of turns. The screw members 23 and 25 are mounted for rotation about axes 24 and 26 respectively, said axes having a skew relation to one another, that is, neither parallel nor intersecting, with a skew angle $\alpha$ defined as the angle between planes containing each of such axes, which planes intersect at P to define a line extending the shortest distance between skew axes 24 and 26. With such a skew axis arrangement, the pitch diameter surface line P.D. will have the form of a hyperboloid of revolution as can be established by determining the increase in diameter which occurs upon departure from line P in either direction along an axis 24 or 26 (Fig. 3).

The intermeshing threads on the screw-threaded members 23 and 25 are generally rectangular in cross-section, at least as a useful approximation, with generally flat crests 27 and bottoms 29 and have a constant and uniform lead L which results in a decreasing lead angle A at the pitch surface as the pitch diameter increases upon departure from line P. Furthermore, the sides 28 of the threads as seen in longitudinal section, as in Fig. 2, lie along lines connecting the axes at points equidistant from line P, and are not perpendicular to the axis of a screw-threaded member except at line P.

The shapes of the surfaces in which crests 27 and bottoms 29 may lie are, within limits, a matter of choice to suit the use to which the apparatus will be put, as will be made clear in describing preferred embodiments of the invention below. In general, one surface may be chosen arbitrarily, either that defining the crests of the threads, or that defining the roots, and the other is fixed thereby, for a given pair of axes, and is theoretically defined as that surface which will touch the chosen surface along a line of contact when the two members are rotated in the same direction about their respective axes, neglecting clearances.

In the embodiment shown in Figs. 1–3, the crest surface has been chosen so that the ratio of crest diameter to pitch diameter at a given distance along the axis remains constant. In this case the addendum of the thread at any point is equal to the dedendum at that point, and the depth of the thread increases with distance along the axis from line P. The crest and root surfaces in this case are of a shape which is similar, but not identical, to a hyperboloid of revolution. Other surfaces may be chosen to suit a particular need, as for example a conical crest surface with its corresponding curved root surface (Figs. 19–22). Furthermore, if the two screw-threaded members 23 and 25 are identical, the crest surface must have larger diameters at all points than the pitch surface defined by points equidistant between the axes. Likewise the root surface must always be smaller than this pitch surface.

While we have chosen to use identical screw-threaded members for purposes of illustration, the invention is not so limited. Thus, it is possible, for example, to use a double-lead-screw-threaded member with a single-lead-screw-threaded member of one-half the diameter but rotating at twice the angular velocity of the former, these being set at a skew angle $\alpha$ of approximately twice the lead angle of the threads. It is also possible to use two or more screw-threaded members of any combination of lead and of diameter so long as the skew angle $\alpha$ between any two members equals the sum of the lead angles of the respective screw threads, and the angular velocity of the members results in the screws of each advancing at the same rate along the respective axes. It is hence possible to use two members at identical crest diameters, but one with a single-lead thread and the other with a double-lead thread. In this case, the first member will rotate at twice the angular velocity of the second, the skew angle $\alpha$ will be three times the lead angle of the first, and the pitch surfaces, which move at equal peripheral speed, may lie wholly without the screw threads. It is to be noted that the term "lead angle" refers to a concept which is only approximate, since the lead angle for a screw thread of lead L can be exactly defined only for a specific diameter, for example, the pitch diameter at one point and, as will be seen below, we prefer to make our exact definition in other terms.

Figure 4:
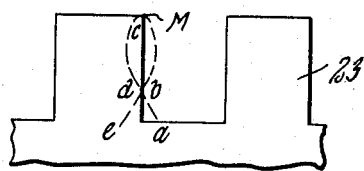
Figs. 4 through 7 are enlarge axial cross-sectional portions of the screw of Fig. 2 showing the development of a tooth form thereof.
Figure 5:
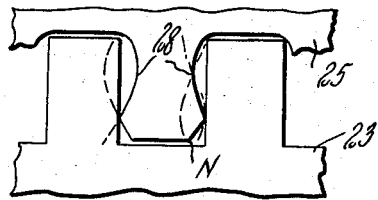
Figure 6:
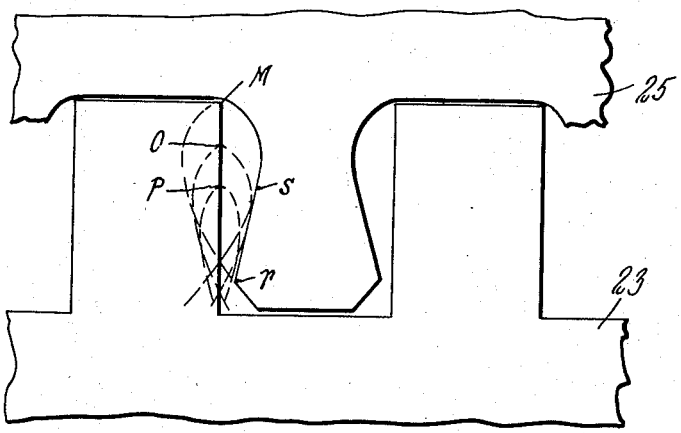
Figure 7:
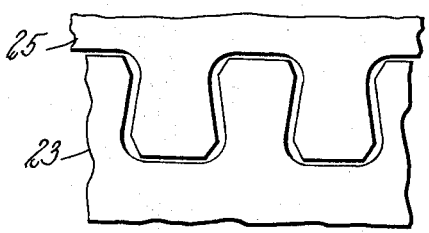

For best sealing, the sides 28 of the threads are formed in a manner which can best be understood by reference to Figs. 4 through 12. Fig. 4 is a sectional view of the screw-threaded member 23 along a plane through its axis showing a rectangular thread form. The broken line $a$—$b$—$c$—$d$—$e$ traces the path of a point M on the outer edge of one thread, relative to a thread of associated member 25 as the point M travels through the zone of meshing. Fig. 5 shows how this path generates a profile in the sides 28 of the mating thread of member 25, and also shows the path of a point N on the outer corner of a thread of member 25 relative to the meshing thread of the member 23. Fig. 6 shows the paths of further points O and P and how these paths further modify the profile of the thread on member 25. Fig. 7 shows the manner in which two screw members with identical thread profiles so formed would mesh, and Figs. 8 and 9, in which the letters $a$—$r$—$c$—$s$—$e$ refer to Figs. 4 and 6, show that with threads of the profiles shown in Fig. 6, the outer corner of one member touches the side of the thread of the other member through arcs $a$—$r$ and $c$—$s$, while leaving some gap during arcs $r$—$c$ and $s$—$e$, the scale of Fig. 9 being exaggerated ten times in the axial direction for clarity, neglecting the running clearance.

Fig. 10 illustrates the basis for the derivation of the thread form shown in Figs. 6–8. Thus, in Fig. 10, the path of point M is shown with reference to a pair of coordinate axes. For convenience we have chosen the axis 24 of the member 23 for one such axis, and a line perpendicular to it for the other. The path of the point M can then be defined by the following equations in which the coordinates R and Y are expressed as a function of a third variable $\beta$, which is the angle traveled by point M about the axis of the member 23 as it rotates.

$$R = \sqrt{h^2 + g^2}$$

$$Y = -a'' - \frac{L}{2\pi}\delta + \frac{D}{2}\sin(\psi+\beta)\sin\alpha$$

where:
$\alpha$ = total skew angle between axes.
$P$ = distance between axes at closest approach.
$D$ = diameter for any point M on outside corner of a thread.
$L$ = lead of screw thread.
$l$ = distance along axis from line P to R axis.
$\beta$ = independent variable (angle traveled by point M).
since:

$$h = \frac{D}{2}\sin(\psi+\beta)\cos\alpha\cos\theta - \frac{D}{2}\cos(\psi+\beta)\sin\theta$$

$$g = a' - \frac{D}{2}\cos(\psi+\beta)\cos\theta - \frac{D}{2}\sin(\psi+\beta)\cos\alpha\sin\theta$$

$$a'' = 2l\sin^2\frac{\alpha}{2}$$

$$\delta = \beta + \arctan\frac{h}{g}$$

$$\theta = \arctan\left(\frac{l\sin\alpha}{P}\right)$$

$$\psi = \arctan\left(\frac{\tan\theta}{\cos\alpha}\right)$$

$$a' = \sqrt{P^2 + (l\sin\alpha)^2}$$

The above equations are general, and thus can be solved to give a tooth profile for any set of screw-threaded members set at any skew angle, and for any choice of diameter at any distance from line P. Furthermore, it can be seen that the lead L can be varied as desired, and the correct profile still be obtained. It must not be thought, however, that the lead L is completely independent of the other variables, for we have found, as hereinafter explained, that only certain combinations of lead L and skew angle $\alpha$ will give the best results when the invention is to be used as a pump for liquids or liquid-solid mixtures at high pressures. Furthermore, we prefer that the skew angle be in the range of 5 to 30 degrees.

Thus, referring again to Fig. 10, the path of point M has been shown therein for a combination of skew angle and lead such that the distance $u$ across the loop of the path is equal to the distance $v$ across the ends. If the skew angle $\alpha$ of such a pair of screw-threaded members were increased without changing the lead L, a path as shown in Fig. 11 would be obtained. Conversely, if the skew angle were decreased, a path as shown in Fig. 12 would be obtained. In either of these latter two cases, the gaps occurring along the portions b—c or d—e of the path a—b—c—d—e are increased, and hence, if the screw-threaded members were to be used in a suitable housing to pump, for example, liquid-solid mixtures into high pressure, such increase in the gaps between the sides 28 of the intermeshing threads would decrease the efficiency of such pump by the amount of liquid which leaks back from the discharge side to the suction side.

In all of Figs. 4 through 12, the width of the path of point M (length $u$ or $v$ in Fig. 10) has been greatly exaggerated in order to make the drawings more legible. In an actual case the dimension $u$ (which we preferably chose equal to dimension $v$) will be quite small. For example, in a pair of screw-threaded members 23 and 25 where the skew angle $\alpha$ equals approximately 15°, the distance P between the axes equal approximately 8 inches, the depth of the thread is chosen at approximately 3 inches, and the lead L is taken at 4½ inches, if the path of a point M is drawn for a portion of a thread at a distance $l$ from the line P of approximately 24 inches, the width $u$ or $v$ of the curve will be approximately 0.120 inch.

Because this width is so small in proportion to the size of the threads, a good approximation to the theoretical form can be had by making the side 28 of the threads straight. Thus, in Figs. 5 and 6, it can be seen that the increase in gap between the tooth profiles due to this approximation consists in a roughly triangular area of height equal to ½ $v$ plus a small triangular area at the root corner of the thread. This can also be seen from the broken line in Fig. 9, which illustrates the meshing of a rectangular thread form. Where, in the example given above, ½ $v$ equals approximately .060 inch on a thread three inches deep, this can be seen to be a very close approximation, and clearly with straight sides, the distance between threads must be greater than the thread width by the amount $v$ plus running clearance, which has been neglected to simplify the above discussion, but which is preferably employed so that the screw-threaded members will neither run in contact with each other or with the housing.

Referring again to Fig. 10, it can be seen that only at line P would the path traced by point M be symmetrical about a line perpendicular to the axis of the screw-threaded member. At other points the path obtained from the above equations lies inclined to such a line, and actually lies generally along a line connecting the two axes at points equidistant from line P. It can further be seen that the bottom of the path of a point M on one screw-threaded member defines the root of the thread on the other member, so that a succession of such curves can be calculated from the equations given above and the lowest points on these will give the curved line defining the roots of the threads on one member.

In operation, then, when the screw members 23 and 25 of Figs. 1 and 3 are simultaneously rotated in the same direction as shown by arrows in said figures within a housing having a body portion that conforms closely to their outer configuration, material introduced at the right-hand side of Fig. 1 will be advanced toward the left-hand side thereof in separated volumes defined by one turn of the thread from one sealing line to the next at the lines of contact of cooperating thread bottoms and crests (Fig. 3), and any backward flow will be prevented by such lines of contact, which are present whether the screw members be rotated or not. Furthermore, the provision of a plurality of such sealing lines of contact, as by the use of two or more full turns of threads on the members, operate to provide multiple stage sealing which will reduce the inevitable leakage to a still greater degree, it being understood that running clearances of the order of at least 0.001 inch, and generally greater with increasing screw member diameter, are to be employed.

Although the above described structure can be designed and built to provide an especially desirable pump, or the like, somewhat simplified forms thereof are preferred as practical commercial pump structures, which structures also may have various advantages over that above described.

Thus, as shown in Figs. 13 through 17, a pair of intermeshing screw members 32 and 34 of generally cylindrical shape may be provided in intermeshing relation with one another, the planes of the skew axes 33 and 35 of such screw members intersecting at P about midway thereof, so that the cylindrical shape of the members is a sufficiently accurate approximation of the theoretical form, at least at a skew angle $\alpha$ of about 10 degrees as shown. In this case, both the crests 36 and bottoms 38 of the threads are parallel to their respective skew axes with thread sides perpendicular thereto, and the lead angle A is half the skew angle $\alpha$. These screw-threaded members are relatively simple in design and construction and provide, when rotatably mounted and driven in a housing 39 having an interior portion which conforms closely to their outer configuration, a pump suitable for many applications.

The sealing lines of such pump can be made most nearly precise at the line of plane intersection P, along which line Fig. 15 is taken, at which point the crest 36 of a thread on one of the screw-threaded members is as closely adjacent the bottom 38 of the cooperating thread on the other screw-threaded member as manufacturing tolerances will permit. The fit at either side is less exact, but it nevertheless can be made close enough to provide a substantial multiple stage sealing effect over the four turn screws as shown.

Figure 18:
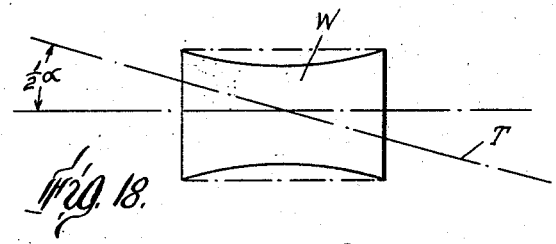
Fig. 18 is illustrative of a method of manufacture of screws according to the present invention.
Figure 19:
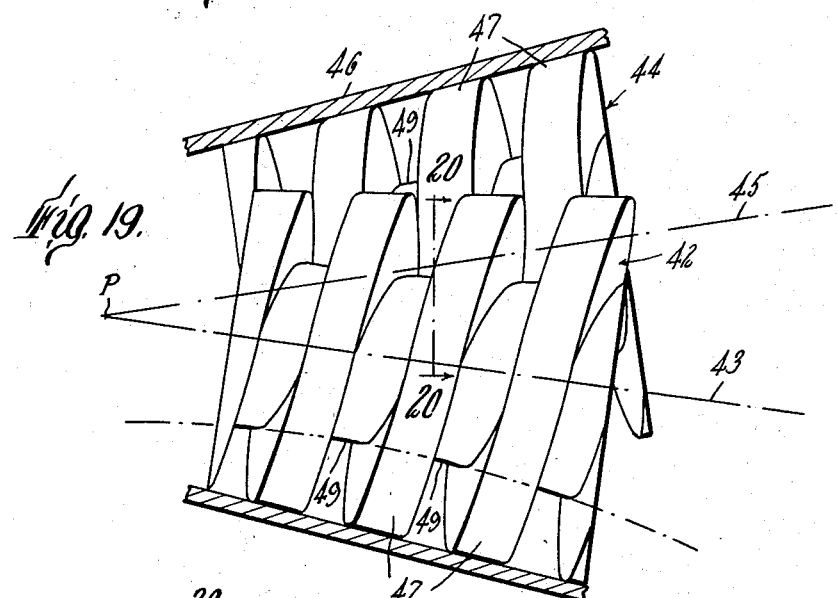
Fig. 19 is a side view of a pair of conical intermeshing screws according to another modification of the present invention.

We have also found that it is possible, by a simple modification of the conventional method of manufacture of screws, to generate screw-threaded members generally cylindrical as described in the preceding paragraph and illustrated in Figs. 13–17, but having considerably more precise sealing lines and hence suitable for more exacting service, e.g. at higher pressures and with lower viscosity liquids. An understanding of this method of the invention can be had by reference to Fig. 18, wherein a workpiece W is rotated at a uniform rate on a suitable arbor such as on a lathe, while cutting first the outer surface to provide the thread crests and then the screw threads themselves with a suitable tool along a line T bearing a skew relation to the axis of workpiece, specifically at an angle which is equal to one half of the skew angle $\alpha$ above defined for the screw-threaded members. The resulting screw-threaded member will take a different form, in which the surfaces containing the crests and the roots of the generally rectangular threads will be hyperboloids of revolution. Such surfaces give close approximation to theoretical meshing at all points when two or more such members are rotatably mounted in proper skew relationship to one another. In such case, too, the sides of the threads in longitudinal section will be perpendicular to the axis only at the center, while being inclined to the axis toward the ends, in close approximation to the theoretical direction of a line connecting the skew axes of two such members when properly mounted.

In Figs. 19 through 22 is shown a pair of generally conical intermeshing screw members 42 and 44 which have certain advantages over those of the cylindrical shape above described, principally as to their ability to compensate for wear both as to a surrounding housing and to each other by axial adjustment relative to the housing, but also as to fit at its sealing lines. Said pair of generally conical screw members 42 and 44 are mounted for rotation in housing 46 by suitable bearings, as hereafter described, about skew axes 43 and 45 respectively. As above described with reference to Figs. 1 through 3, the approximation of a conical screw member occurs generally away from the line of intersection P of planes containing the skew axes, so that if wear tends to increase the clearances of the structure, axial movement of the screw-threaded members toward their smaller ends and relative to the housing 46 will decrease the excessive clearances as desired. To assure that such axial movement will result in the same reduction of radial clearance at all points along the screw-threaded member, the interior surface of housing 46 and the crests 47 of the threads are made conical with the same degree of slope, herein shown as about 5.7 degrees. As described above, however, the bottoms 49 of the threads are curved to make a more nearly theoretical fit. It may be noted that this curve is gradual, and could be approximated by a conical surface or a succession of several conical surfaces of different slope. The generally straight sides of the screw threads, as seen in longitudinal section in Fig. 22 generally lie along lines connecting the axes of the two members 42 and 44 as described above, and may be made approximately so by generating the screw threads as described above. With such a pair of conical screw-threaded members, surprisingly accurate fit may be obtained over a plurality of turns to provide effective multiple stage sealing, as shown in Figs. 20–22.

In Fig. 23 is shown a complete pump employing the conical screw-threaded members of Figs. 19–22. Such a pump is capable of pumping liquid-solid mixtures such as wood pulp of 10% solids into pressures of the order of 1000 p.s.i.

As shown, the pump comprises a housing 50 with an inlet opening 51 at its left side and an outlet opening 53 at its right side, the intermeshing screw-threaded members 42 and 44 being mounted for rotation about their skew axes within the central portion of said housing. For so mounting said members, they are each provided with extension shafts, preferably integral, an input end extension shaft 54 preferably with a screw conveyor flight 60 thereon adjacent inlet opening 51, and an output extension shaft 62. The input end extension shafts are mounted within a portion of the housing by suitable bearings 55, seals 56 being provided within the bearings 55 to contain the liquid-solid mixture. The output extension shafts 62 extend through the opposite end of housing 50 and are also provided with bearings 64 and seals 65 as well as a thrust bearing 68 for resisting the force on the screw members imposed by the presence of high pressure at the outlet opening 53. For driving the output extension shafts 62 at the same speed in timed relation to one another, they are each provided with a universal joint 64 driven by a gear 66, said gears being driven by a common driving pinion 67 therebetween for driving the screw-threaded members in the same direction. Any suitable motor means may be employed for driving pinion 67.

The conical screws 42 and 44 having an approximately constant depth of thread are preferably mounted with their larger diameters adjacent the output end of the pump, as shown, so that the volume available to material being pumped thereby will increase as said material moves through the pump to avoid any tendency for pressure locking and possible resulting damage. However, as explained above, it is possible to vary such volume as desired in either direction by varying the thread depth.

In order to aid in resisting the thrust imposed by high pressure on the end of screw-threaded members 42 and 44 adjacent outlet opening 53, novel thrust balancing means are provided in the housing adjacent thereto. Such means includes a collar 70 on each output extension shaft 62, of larger diameter than the root diameter of screw-threaded members 42 or 44 at the discharge end, and extending through stuffing box 56 or other suitable pressure seal. The pressure in the discharge chamber 53 acts against the annular area of the collar 70 to produce a force which counteracts in part or entirely, depending on the relative diameters of the screw-threaded member 42 and the collar 70, the thrust developed by the discharge pressure against the annular area of the screw thread.

For setting radial clearances by axial adjustment of screw-threaded members 42 and 44 relative to housing 50, shims 72 are provided interposed between said housing and each of the supports for bearings 64 and 68, shims of increasing thickness being employed as wear makes adjustment desirable.

To operate the pump of Fig. 23, pinion 67 is driven by any suitable means to rotate screw members 42 and 44 as well as conveyor flight 60 at a speed of about 300 to 600 r.p.m. for conical rotors of a diameter of about 13–16 inches. This causes the liquid-solid mixture, such as pulp at about 10% solids, introduced at inlet opening 51 to be advanced from left to right as shown in the drawings, while contained within the volume bounded by the interior surface of the body portion of housing 50 and the sides and bottoms of the threads on each of the screw-threaded members 42 and 44. Since the intermeshing of the threads of such members provides an effective seal for each complete turn of each of the threads, multiple stage sealing is provided and backward flow is prevented whether the screw-threaded members be rotated or not, which is important from a safety consideration. Such a pump may also be used as a pressure reducing discharger, as for removing a liquid-solid mixture from a region of high pressure to that of a lower pressure.

In Fig. 24 is shown a novel screw press employing the conical screw-threaded members of Figs. 19–22 and capable of expressing liquid from liquid-solid mixtures by progressively decreasing the volume of said mixture as it passes through the press. This we accomplish by mounting the conical screw-threaded members with their smaller diameters adjacent the output end of the press and by providing suitable apertures in the surrounding housing, so that as a liquid-solid mixture moves through the press, at least a portion of its liquid component will be expressed through said apertures because of the decreasing volume available to said mixture. If greater compression is desired, screw threads of decreasing depth may also be utilized.

More specifically, the screw press comprises a housing 80 having a plurality of apertures 81 of relatively small size and with an inlet opening 82 at its left and an axially extending outlet opening 84 at its right as shown in the drawing, the intermeshing screw-threaded members 42 and 44 being mounted for rotation about their skew axes within said housing. For so mounting the members, they are each provided with extension shafts 86, preferably integral, at their large diameter input ends for cantilever support of said members. Said extension shafts are mounted within a portion of the housing 80 and are provided with spaced bearings 87 and 88, the latter, adjacent the outer end of the housing, preferably being a thrust bearing. Driving means similar to that of the above described pump is provided for driving shafts 85 in timed relationship. Similarly, a suitable seal 89 between the inner bearing 87 and the interior of housing 80 may be provided, and, also shims 90 may be provided for setting radial clearances as wear makes such desirable.

In operation, the shafts 86 are driven at a suitable speed to advance the liquid-solid mixture through the apparatus. During such advance, the decrease in available volume causes the liquid component, or at least a portion thereof, to be expressed through apertures 81, the remaining portion, as well as the solid portion of the mixture being discharged at outlet opening 84.

Thus it will be seen that the invention provides a novel plural intermeshing screw structure especially useful as a high pressure pump and screw press, or the like for liquid-solid mixtures such as wood pulp. Various modifications, other than those herein disclosed, within the spirit of the invention and the scope of the appended claims will occur to those skilled in this art.

We claim:

1. Apparatus of the class described comprising a housing having an inlet and an outlet and a body portion therebetween, a plurality of intermeshing screw-threaded members mounted in the body portion of said housing for rotation in the same direction about non-parallel, non-intersecting skew axes, said members each having threads with lead of the same hand extending for at least one turn through said body portion closely adjacent thereto with the crests and bottoms of said threads closely adjacent one another effective to provide substantial fluid sealing.

2. Apparatus as claimed in claim 1 wherein said members are generally cylindrical.

3. Apparatus as claimed in claim 1 wherein said members are generally conical.

4. Apparatus as claimed in claim 1 wherein said threads are generally rectangular with flat crests and bottoms.

5. Apparatus as claimed in claim 4 wherein said skew axes are at an angle to one another in the range of 5 to 30 degrees and said screw-threaded members intermesh for a plurality of turns providing multiple stage sealing.

6. Apparatus as claimed in claim 1 wherein the crests and bottoms of said threads have the form of a hyperboloid of revolution.

7. Apparatus as claimed in claim 1 wherein said screw-threaded members intermesh for a plurality of turns providing multiple stage sealing.

8. Apparatus as claimed in claim 7 wherein said skew axes are at an angle to one another of the order of 10 degrees.

9. Apparatus of the class described comprising a housing having openings including an inlet and an outlet, and a body portion therebetween, a pair of intermeshing screw-threaded members mounted in the body portion of said housing for rotation in the same direction about non-parallel, non-intersecting skew axes, means for rotating said members in timed relationship to one another, said members each having threads with lead of the same hand extending for at least two turns through said body portion closely adjacent thereto with the crests and bottoms of said threads closely adjacent one another effective to provide substantial multiple stage fluid sealing.

10. Apparatus as claimed in claim 9 wherein said threads are generally rectangular with flat crests and bottoms and the skew angle between said axes is in the range of 5 to 30 degrees.

11. Apparatus as claimed in claim 9 wherein said intermeshing screws and said housing provide progressively increasing available volume from said inlet to said outlet.

12. Apparatus as claimed in claim 9 wherein said housing has apertures in its body portion extending therethrough, and said intermeshing screws and said housing provide progressively decreasing available volume from said inlet to said outlet.

13. Apparatus as claimed in claim 9 further comprising means mounted on said members adjacent one of said openings for balancing at least a portion of the thrust thereof.

14. Apparatus as claimed in claim 9 further comprising means mounted in advance of said members adjasaid inlet for conveying materials from said inlet to said members.

15. Apparatus as claimed in claim 9 wherein said intermeshing members are provided with shafts at one of their ends, said shafts being mounted in said housing adjacent one end thereof for cantilever support of said members, one of said housing openings extending from the other end of said members generally axially thereof.

16. Apparatus of the class described comprising a housing having an inlet and an outlet and a body portion therebetween, a pair of generally conical intermeshing screw-threaded members mounted in the body portion of said housing for rotation in the same direction about non-parallel, non-intersecting skew axes, means for rotating said members in timed relationship to one another, means for setting the clearance of said members by axial adjustment thereof, said members each having threads with lead of the same hand extending for at least two turns through said body portion closely adjacent thereto with the crests and bottoms of said threads closely adjacent one another effective to provide substantial fluid sealing, said threads having generally flat crests with a conical crest surface and generally curved roots with a curved root surface.

17. Apparatus as claimed in claim 12 wherein the skew angle between said axes is in the range of 5 to 30 degrees.

References Cited in the file of this patent

UNITED STATES PATENTS

| | | |
|---|---|---|
| 1,735,477 | Stuart | Mar. 12, 1929 |
| 2,048,286 | Pease | July 21, 1936 |
| 2,477,797 | Girz et al. | Aug. 2, 1949 |
| 2,592,476 | Sennet | Apr. 8, 1952 |

FOREIGN PATENTS

| | | |
|---|---|---|
| 347,246 | Great Britain | Apr. 20, 1931 |
| 617,432 | Germany | Aug. 21, 1935 |
| 789,211 | France | Aug. 12, 1935 |